Nov. 14, 1939.  R. LAPSLEY  2,180,116
TRANSMISSION CONTROL MECHANISM
Filed May 10, 1935  5 Sheets-Sheet 1

Inventor:
Robert Lapsley
By:
Attys

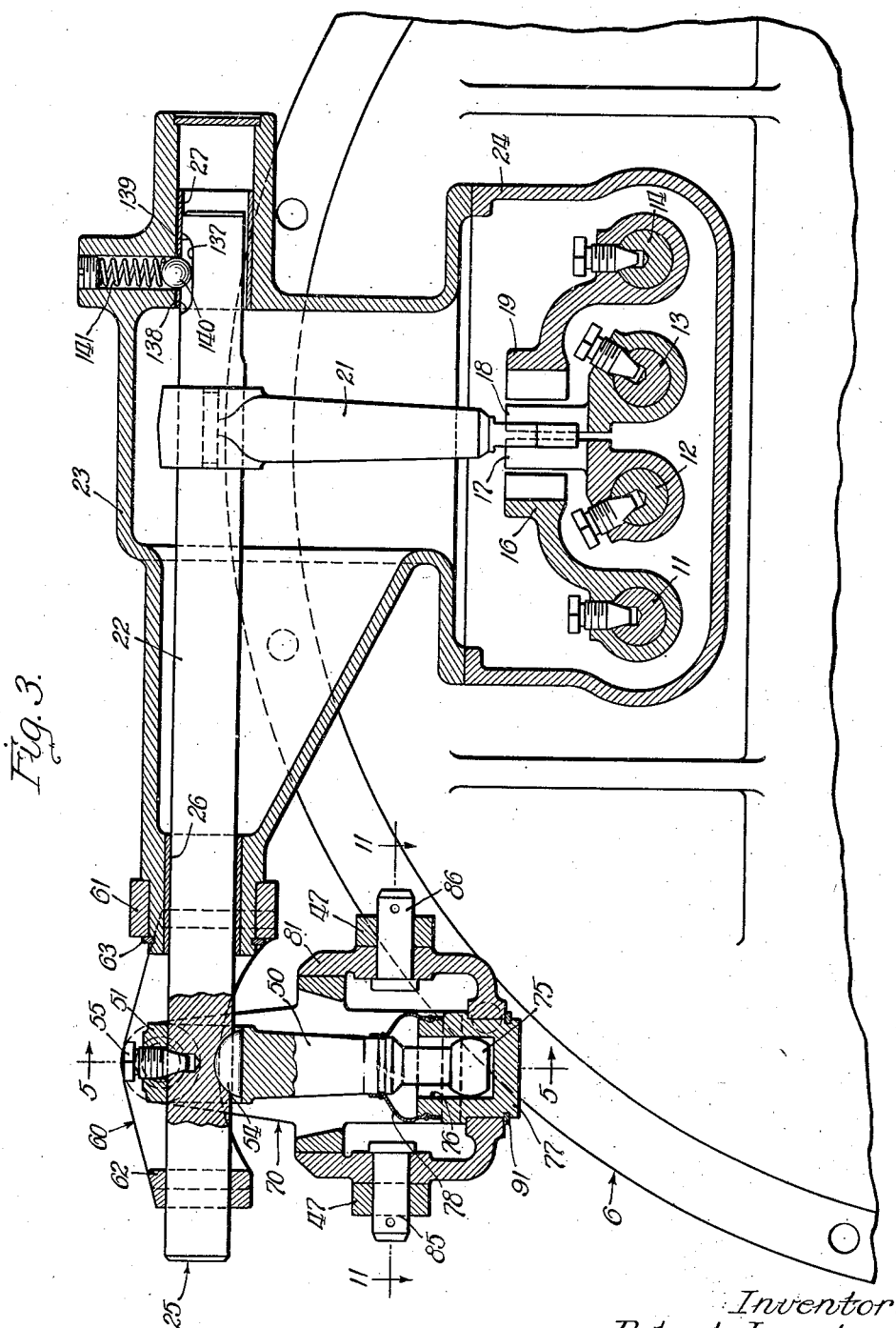

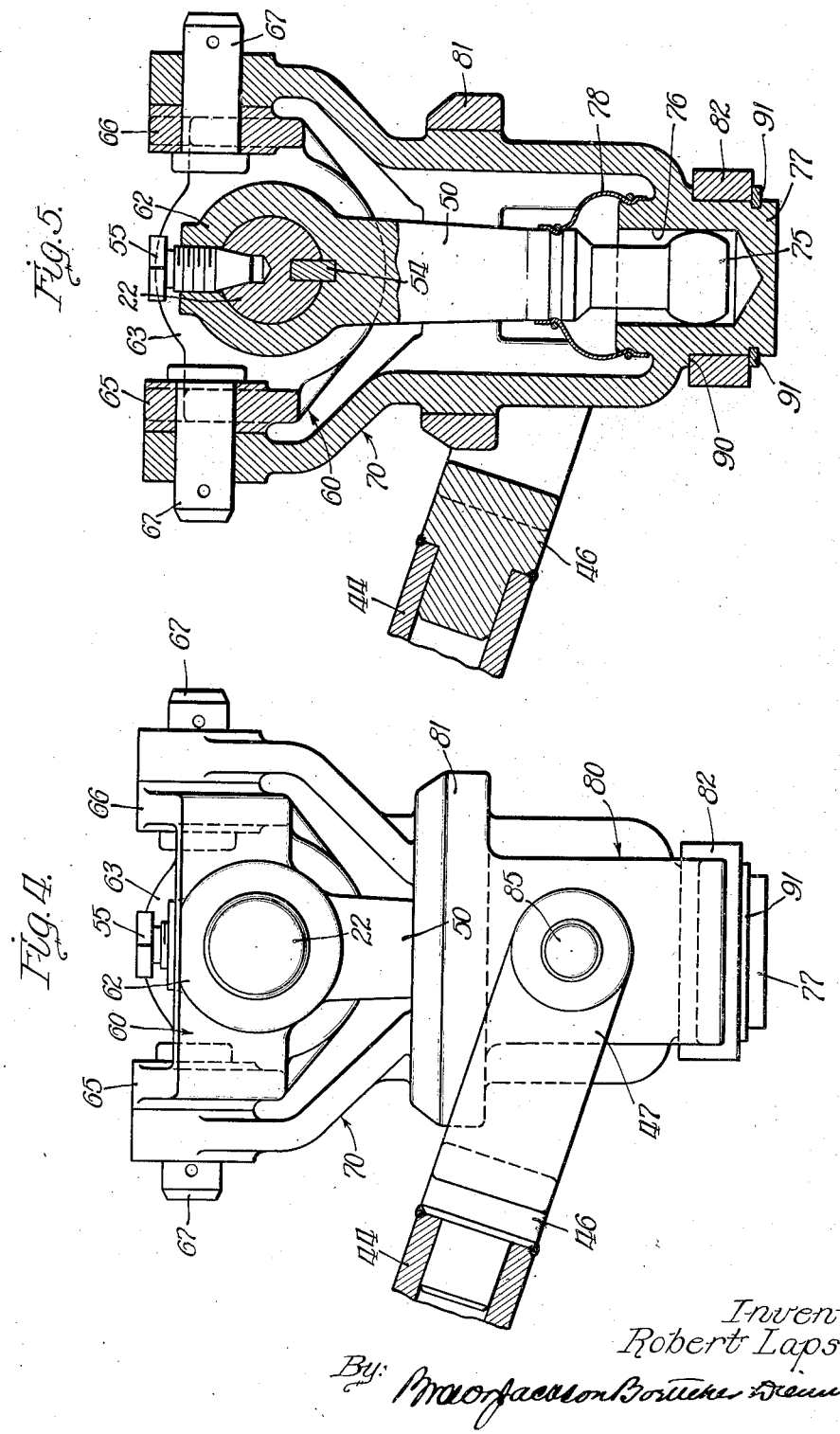

Nov. 14, 1939.   R. LAPSLEY   2,180,116
TRANSMISSION CONTROL MECHANISM
Filed May 10, 1935   5 Sheets-Sheet 4

Inventor:
Robert Lapsley
By: Brown, Jackson, Boettcher & Brennan
Att'ys.

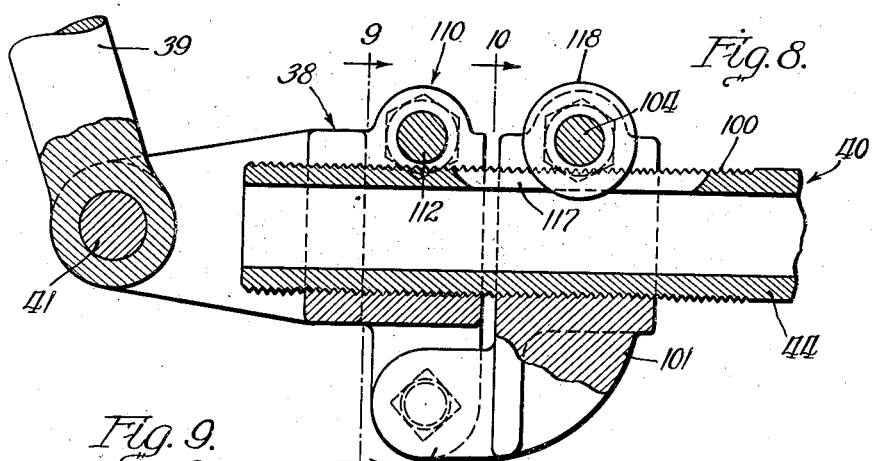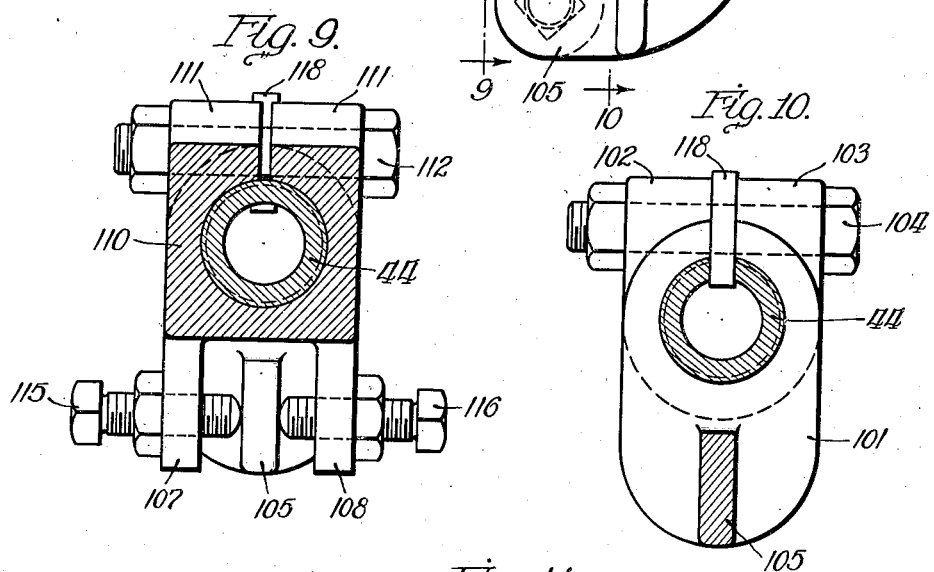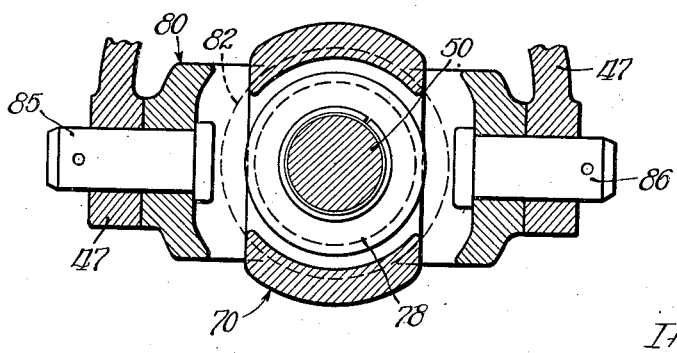

Patented Nov. 14, 1939

2,180,116

UNITED STATES PATENT OFFICE 2,180,116

TRANSMISSION CONTROL MECHANISM

Robert Lapsley, Berrien Springs, Mich., assignor to Clark Equipment Company, Buchanan, Mich., a corporation of Michigan Application May 10, 1935, Serial No. 20,803

25 Claims. (Cl. 74—473)

The present invention relates to control means for transmissions and the like and is particularly concerned with the provision of a new and improved remote control system in which the gear shift lever can be disposed on the vehicle in any one of a number of positions, relative to the gear box, according to the design or requirements of the vehicle.

The principal object of the present invention is the provision of a remote control system by which the gear selecting and shifting means is operated by uniform movements of the gear shift lever, irrespective of the position of the latter relative to the transmission, and also irrespective of any shifting or weaving of the vehicle parts between the gear box and the support for the gear shift lever itself. An additional object of the present invention is the provision of a remote control system which is so constructed and arranged that the gear shift lever may be positioned in any number of a variety of positions without requiring any special adjustments or special parts. Specifically, it is an object of the present invention to provide an arrangement wherein the gear shift lever can be disposed in any position within a given radius, generally speaking, of the transmission gear box without affecting the ability to select any desired gear ratio. Still further, another object of the present invention in this connection is the provision of simple and efficient adjusting mechanism by which the gear shift lever may be disposed at greater or lesser distances from the gear box, and generally in any selected lateral or vertical position, without interfering with the normal operation of the gear shift lever and without varying the extent and/or direction of movement of the gear shift lever in selecting and completing the engagement of the desired driving ratio.

Still further, another object of the present invention is the provision of new and improved connections between the universally positioned gear shift lever and the gear box, which connections are so constructed and arranged that they are enabled to transmit to the selecting member of the gear box motions of both translation and rotation, or any combination of them, in such manner that the gear shift lever moves with and at all times in substantially the same direction as the gear selecting member of the transmission gear box in practically the same manner as if the gear shift lever were an integral part of such gear selecting member.

A further object of the present invention is an improved construction for operating the gear selecting member of the gear box, such improved construction comprising a swingably and rockably mounted member which is constrained by suitable connections to move in only two directions, at right angles to one another, whereby the selecting and shifting movements of the gear selecting member are obtained irrespective of the relative position of the gear shift lever and the gear box or the direction of the force arising from the movement of the gear shift lever exerted on the gear shifting mechanism. A further object of the present invention in this connection is the provision of such connections whereby the force exerted on the gear shift lever and transmitted to said mechanism reacts, in turn, upon the gear shift lever itself to constrain the latter for movement in only two directions at right angles to each other, corresponding to the movement of the gear selecting and shifting member.

An additional object of the present invention is the provision of a remote control system in which the hand-operated gear shift lever may be mounted in any position desired, and which will not bind or cramp during its operation due to any flexing or weaving of the frame or the power plant in relation to the hand-lever.

A further object of the present invention is the provision of improved connections between the hand lever and the transmission whereby, by the use of a single connecting link or draw rod, the desired gear can be selected and shifted, the connecting rod being adjustable for both length and angularity and connected, respectively, with the gear shift lever and the gear box by suitable universal joint means, whereby lateral and rotary motion is imparted by the gear shift lever to the connecting draw rod or link and which, in turn, transmits similar motions to the selecting and shifting member of the gear box.

These and other objects and advantages of the present invention will be apparent to those skilled in the art after a consideration of the following detailed description of the preferred structure embodying my invention and illustrated in the accompanying drawings.

In the drawings:

Figure 3 is a cross-sectional view of the construction shown in Figure 1, taken on an enlarged scale along the line 3—3 of Figure 2, with the draw rod swung to a longitudinal position for purposes of clarity;

Figure 4 is an enlarged elevation taken substantially along the line 4—4 of Figure 2, with certain parts being shown in section;

Figure 5 is a section taken along the line 5—5 of Figure 3;

Figure 8 is a section taken along the line 8—8 of Figure 2 showing at an enlarged scale certain details of the length adjusting means;

Figures 9 and 10 are sections taken along the lines 9—9 and 10—10, respectively, of Figure 8; and Figure 11 is a section taken along the line 11—11 of Figure 3.

Figure 1:
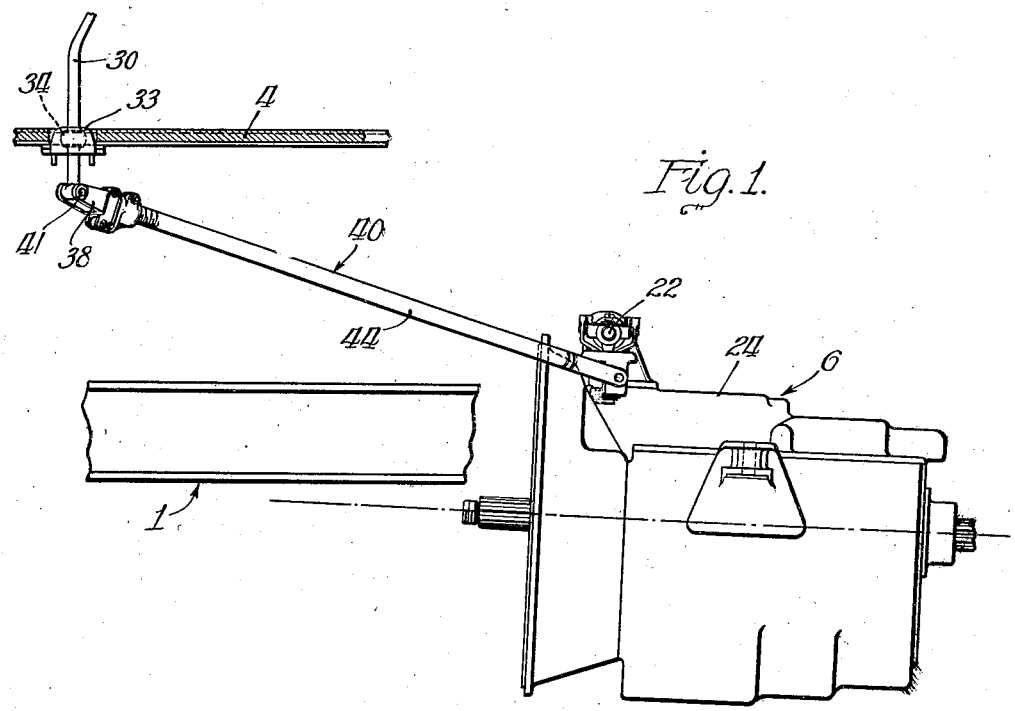
Figure 1 is a side view of a portion of an automotive vehicle, such as a truck or the like, embodying suitable gear shifting connections providing for the universal location of the gear shift lever.
Figure 2:
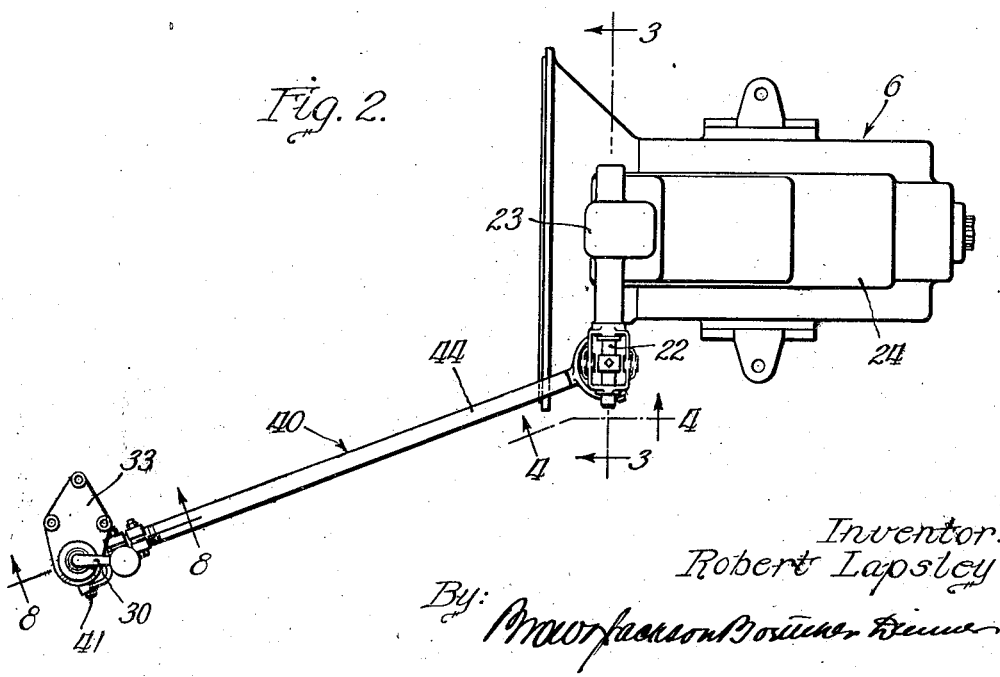
Figure 2 is a plan view of the construction illustrated in Figure 1.

Referring now to the drawings, particularly Figures 1 to 3, inclusive, it will be observed that the principles of the present invention have been illustrated as embodied in a transmission system for an automobile, such as a truck, bus, or the like, having the frame 1 which supports a vehicle body including a driver's seat and floor-board structure 4. The transmission or gear box of the vehicle is indicated in its entirety by the reference numeral 6 and is of conventional construction, being mounted in any suitable manner on the vehicle chassis. The transmission housing or gear box 6 includes the usual sliding or selectively controlled gears, and part of the control means therefor includes a plurality of shift rods, best indicated in Figure 3 by the reference numerals 11, 12, 13 and 14. These shift rods are provided with the usual shift lugs having portions 16, 17, 18 and 19, respectively, which are adapted to be selectively engaged and shifted by a shifting lever or arm 21 mounted on a shift lever shaft 22. The shaft 22 extends transversely of the transmission and is mounted for both sliding and rocking movement in an extension 23 of the transmission housing, the portion 23 being preferably in the form of or serving as a cover bracket formed as a part of a cover plate 24 enclosing and supporting the shift rods 11 to 14. As best shown in Figure 3, the lugs 16 to 19 are nested together and are provided with the usual slots disposed so as to allow the arm or shift lever 21 to project into the slots, and the width of the lever is slightly less than the length of any of the slots whereby the lower end of the arm 21 is enabled to select any one of the lugs 16 to 19 and move it and the associated shift rod lengthwise of the transmission without interfering with any of the other shift rods or lugs. However, upon moving in either direction from neutral position lengthwise of the transmission, the gear shift arm 21 is confined in the slot of the selected lug by the sides of the adjacent lugs, and by this means the lever 21 is prevented from disengaging the selected lug until the gear shift lever has been returned to neutral position. So far as the selection of the shift rods is concerned, this is a conventional form of construction. It is also possible to provide a guide plate associated with the shift lever 21 for governing the movements thereof if such a guide plate is necessary or desirable.

The lever 21 is securely fixed, as by a key and/or clamping means to the shift lever shaft 22 so as to move therewith, both laterally and longitudinally of the transmission housing. The shift lever shaft 22 extends to the exterior of the housing, as indicated at 25 in Figure 3, and suitable bushing means 26 and 27 in the end portions of the housing extension 23 provide for the support of the shift lever shaft 22 to accommodate its rocking and sliding movements. When the shift lever shaft 22 rocks, the shift arm 21 swings longitudinally of the transmission, and when the shaft 22 is moved laterally in the housing extension 23 the shift arm 21 is moved from one of the lugs to another in the neutral position of the shift arm.

The present invention is particularly concerned with the provision of new and improved means for operating the shaft 22 and its arm 21 to select and shift the desired shift rod to secure the particular driving ratio necessary or desirable for the proper operation of the vehicle. In ordinary passenger cars such as those of the usual construction in use for the past several years, the transmission or gear box has usually been so arranged that the manually controllable gear shift lever can be directly connected or formed integral with the lever or arm which controls the shift rods. However, in automotive and other types of vehicles, such as trucks, busses and the like, the disposition of the motor, the driver's compartment and/or the driving mechanism may be such that the transmission must be positioned some distance from the most desirable position for the manually controllable gear shift lever. The present invention is, as stated, concerned with new and improved connections whereby the gear shift lever or hand lever can be disposed remote from the transmission but is so connected with the shifting mechanism of the latter as to operate the same in the usual manner. Usually, also, it is desirable to have the gear shift lever movable through about the same displacement, both fore and aft and laterally of the vehicle, as if the gear shift lever were directly connected with the shifting mechanism to give the proper feel in the operation of the hand lever, and the present invention includes means accomplishing this result.

Referring now more particularly to Figures 1 and 2, it will be noted that the manually controllable gear shift lever, indicated in its entirety by the reference numeral 30, is spaced appreciably forward of the transmission 6 and also to the left thereof. Briefly, I provide connecting means between the gear shift lever 30 and the transmission 6 comprising a draw link or rod and means in the form of universals connecting the link with the manual gear shift lever and the shifting mechanism so that such connecting means may act in torsion to select the proper or desired shift rod, in accordance with lateral movements of the gear shift lever, and will act in compression or tension generally fore and aft of the vehicle to move the selected shift rod and associated gear to completely meshed position with substantially the same extent and direction of movement irrespective of the particular position of the gear shift lever relative to the gear box. By virtue of such universal connection, the gear shift lever may be disposed in almost any position with respect to the transmission, yet the gear shift lever will be constrained to move laterally and longitudinally with the transmission selecting mechanism so that the gear shift lever can be operated in the normal manner and select and shift the gears irrespective of its particular position at any one time or any shift in its position with respect to the transmission at any time.

Figure 6:
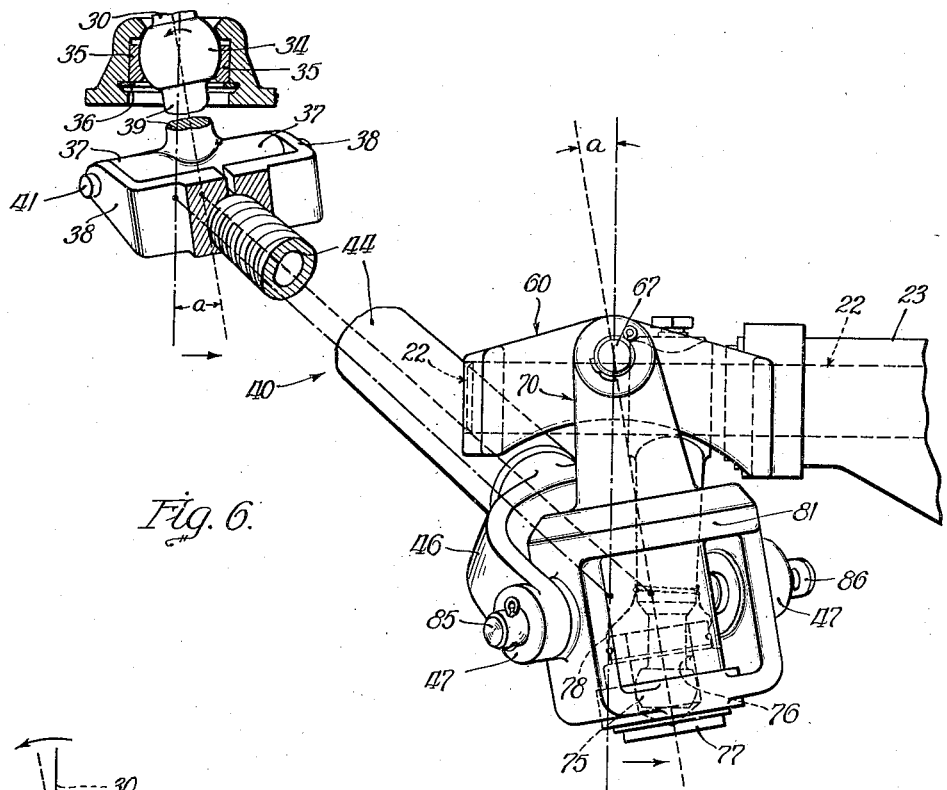
Figure 6 is a view similar to Figure 3, showing the position of the connecting mechanism when the gear shift lever has been moved laterally with respect to the vehicle to cause the gear selecting member to select one of the shift rods of the transmission but before the member has been shifted fore and aft to actually move the rod, and the associated gear, into its final selected position.

The manually operated gear shift lever 30 is mounted in a ball and socket support for universal movement as best shown in Figure 6, and such support comprises a mounting bracket 33 adapted to be supported in any manner desired on the vehicle or chassis, the mounting bracket 33 serving to receive a pivot ball 34 formed integral with or carried by the gear shift lever 30, and the pivot ball 34 on the gear shift lever is retained in the supporting bracket 33 by a pair of split socket washers 35 and a spring retainer ring 36. The lower end 39 of the gear shift lever is formed with or carries a sleeve or wrist portion at its lower end in the form of apertured laterally directed sections 37, and to this end of the gear shift lever the forward forked yoke 38 of a connecting link structure, indicated in its entirety by the reference numeral 40, is pivotally connected, as by a hinge pin 41 or the like. The yoke 38 forms a portion of adjusting mechanism which will be referred to later, but it will be observed that by virtue of the forked connection between the link structure 40 and the lower end of the gear shift lever 30, the only relative movement permitted between these parts is a pivotal motion about the hinge pin 41. The yoke 38 is connected by the above mentioned adjusting mechanism, which will be described later, to a tubular member 44 which extends rearwardly and has welded to its rear end a rear yoke 46 having arm portions 47 that are connected by means now to be described with the shifting mechanism of the transmission. As will be obvious, particularly from Figure 6, the connecting link 44 need not have its ends forked, as at 38 and 47, for any suitable hinged connecting means may be employed.

Referring now to Figures 3, 4 and 5, an outer arm or shifting lever 50 is provided with a collar section 51 and is fixedly mounted on the exterior end of the shift lever shaft 22 by any suitable means, such as a key 54 and a set screw 55. By virtue of this construction the outer arm 50 moves bodily with the shifting arm or lever 21, both laterally and longitudinally of the transmission. A rocking bracket 60 is mounted for swinging movement about a transverse axis with respect to the transmission housing, being provided with two sleeve sections 61 and 62. The sleeve section 61 is mounted on a reduced portion of the housing extension 23, being held thereon by a spring retainer ring 63, and the other sleeve portion 62 is mounted directly on the outermost end portion of the shift lever shaft 22, as best shown in Figure 3. The rocking bracket 60 includes two supporting sections 65 and 66, as best shown in Figures 4 and 5, which are disposed on opposite sides of the shaft 22, as best shown in Figure 6, and are apertured to receive a pair of pivot pins 67 which serve to establish a generally longitudinally disposed pivot axis upon which a laterally swingable member 70 is mounted for swinging movement laterally of the transmission. Thus, where the rocking member 60 is limited in its movements to rocking in a fore and aft direction about a transverse axis, defined by the shaft 22, the swinging member 70 is limited in its movements to a lateral swinging or pivotal motion about a generally longitudinal axis, defined by the pivot pins 67. In other words, the rocking member 60 is limited to movement in a vertical longitudinal plane, while the direction of movement of the swinging member 70 is in a lateral vertical plane disposed at right angles to the first plane.

According to the principles of the present invention, means shiftable by a combination of these two movements is arranged to operate the shift lever shaft 22, and to this end, the lower portion of the arm 50 is formed with a ball end 75 which is received in a socket 76 formed in a sleeve section 77 carried at the lower end of the member 70. A boot 78, connected at its lower end by a spring ring or the like to the upper end of the section 77 and similarly connected at its upper end to the lower end of the shaft arm 50, prevents dirt and the like from entering the socket 76. A bracket 80 in the form of a ring member having upper and lower portions 81 and 82 is carried upon the swinging member 70 for rotation with respect thereto about an axis which extends generally vertically in alignment not only with the shift arm 50, but which also intersects the pivot axes of the rocking member 60 and the swinging member 70. The rotatable bracket 80 carries two pivot pins 85 and 86 arranged in alignment and serving as means forming a hinge axis receiving the arms 47 of the forked yoke 46, the arms 47 being apertured to receive the pins 85 and 86. The pins 85 and 86 thus define the axis of hinging or pivotal movement between the lower or rear end of the connecting link structure 40 and the rotatable bracket 80, and this axis intersects the vertical axis of rotation of the bracket 80 on the swinging member 70. The rotatable bracket 80 is held in place on the lower portion of the swinging member 70 against a shoulder 90 by means of a spring ring 91.

Thus, by virtue of the rocking of the member 60 in a fore and aft direction, the lateral or transverse swinging of the member 70, the rotation about a generally vertical axis of the member 80, and the hinged connection between the latter and the link 46, there is established, in effect, a universal connection between the connecting link means and the shifting mechanism of the transmission so that the shift arm 50, and the shift lever 21 which moves therewith by virtue of the rigid connection of these parts with the shaft 22, may be caused to move laterally or longitudinally by substantially identical lateral or longitudinal movements of the hand lever 30, no matter in what position the latter may be with respect to the transmission itself, whether forward or rearward thereof, or whether higher or lower, or at one side or the other of the transmission 6. If desired, the housing extension 23 may be reversed from that shown in the drawings so as to bring the connections out at the other side of the transmission and the same movements of the gear shift lever will occasion the desired movements of the shifting mechanism. In other words, moving the hand-lever sidewise, in whatever position it may be with respect to the transmission or the vehicle, will select the gear desired by a lateral movement of the shift arms 50 and 21, and lengthwise or longitudinal movement of the hand-lever 30 will move the associated shift rod and gears into mesh, just as if the hand-lever were an integral part of the arm 21 or the arm 50.

Figure 7:
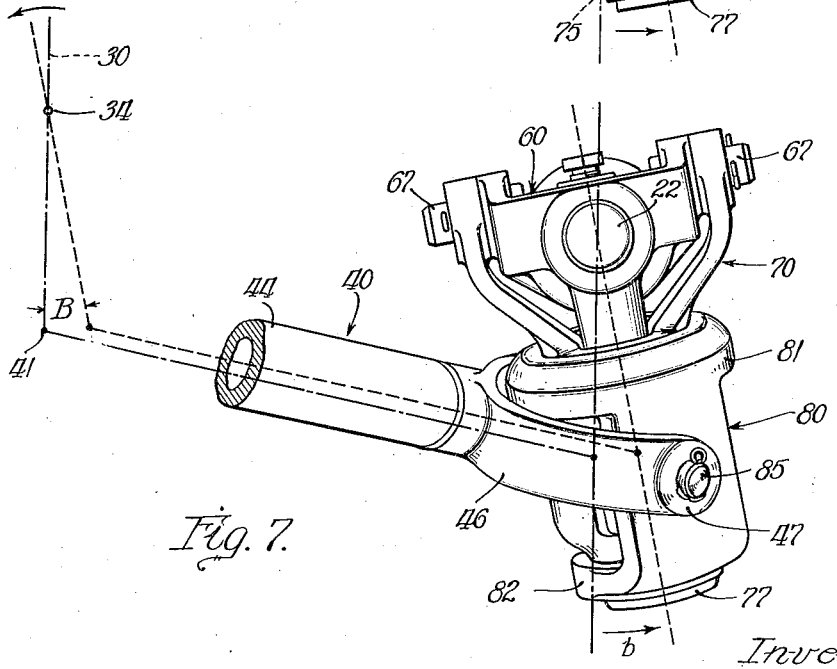
Figure 7 is a side view of the rear connecting parts illustrated in Figure 6, but showing the connections after the gear shift lever has been moved longitudinally of the vehicle to move the selected shift rod rearwardly to bring the selected gear into mesh with its companion gear in the transmission.

The above described operation of the connecting means, in causing the gear shift lever 30 and the remotely mounted shift arms 21 and 50 to execute substantially the same angular movements, entirely independently of the relative position of the gear shift lever and the transmission, is best shown in Figures 6 and 7. From Figure 6 it will be noted that when the upper end of the gear shift lever 30 is moved sidewise or laterally of the vehicle, say to the left, the connecting link structure 40, by its strength in torsion, transmits this angular movement to the swinging member 70, pivoting the latter about the pivot axis defined by the hinge pins 67 through the same angle $a$ through which the gear shift lever 30 is moved, independently of whether the distance from the ball 34 to the hinge pin 41 is the same as the distance between the pins 67 and the pins 85 and 86. If these distances are the same, the rod 40 moves parallel to itself, as indicated in Figure 6, but if these distances are not the same, then the rod 40 is displaced angularly in addition to being rotated about its own longitudinal axis. The abovementioned universal connection between the connecting link means and the shifting mechanism and a slight movement of the gear shift lever about its own longitudinal axis accommodate this angular displacement. The relatively widely spaced points of attachment between the link structure 40 and the gear shift lever 30 and swinging member 70 afford considerable strength in torsion for the connecting parts. When the member 70 thus swings laterally, the lower sleeve section 77 of the member 70 acts against the ball end 75 of the lever 50 and shifts the shift lever shaft 22 to the right as viewed in Figures 3 and 6. In other words, the shaft 22 and the arm 21 move in the same direction as the lower end of the gear shift lever 30. However, since the member 70 is swung about its axis 67 to the right, along with the lower portion of the gear shift lever 30, there is some readjustment of the angularity of the link construction 40 about the pivots 41 and 85, 86, but this is accommodated by a slight rotational movement of the ring member or bracket 80 about an axis which is disposed generally vertically longitudinally of the member 70. During the aforesaid movement, the rocking member 60 has not been rocked about its axis, coincident with the axis of the shaft 22, but the lateral movement of the shaft 22 has caused the arm 21 to select one of the shift rods, 11, 12, 13 or 14, depending on the extent of lateral angular movement through which the gear shift lever 30 has been moved.

In order to complete the engagement of the selected gear ratio, it is now necessary to swing the arm 21 longitudinally about the transverse axis 22, and this is done in the present construction, exactly as in conventional direct-connected gear shift lever, by a fore and aft movement of the gear shift lever 30. Referring now to Figure 7, this view is a side view of the connecting parts after the gear shift lever has been moved forwardly, for example. As will be obvious, this fore and aft movement of the gear shift lever 30 tends to cause a fore and aft movement of the swinging member 70. However, this latter member is restrained in its movement relative to the bracket 60 to a lateral swinging movement about the axis 67, and therefore when the gear shift lever 30 is moved in a fore and aft direction through an angle B a thrust is exerted on the member 70 and the bracket 60 is caused to rock about its axis, which, in turn, causes the parts to swing through the angle $b$ to the position shown in Figure 7, thus rocking the shaft 22 about its own axis and, acting through the shift arm 21, moves the selected shift rod to engage the gear desired. Whether the angle B is equal to the angle $b$, as is usually the case, depends on whether the distance between points 34 and 41 equals the distance from the axis of shaft 22 to the axis of the pins 85 and 86. Preferably, but not necessarily, these distances are the same. The other gear ratios are selected in the same manner and the connecting mechanism functions in a similar manner, as described above in completing the engagement of the gear ratio selected.

It will be clear from the above description that the particular position of the gear shift lever with respect to the transmission is immaterial, since the hand lever 30 may be positioned in practically any position about the transmission, either above or below the same or at either side thereof. Also, if desired, the bracket 60 and associated parts could be disposed above rather than below the shaft 22. The pivoting of the yoke 38 on the pin 41 will allow the lever 30 to be placed in almost any vertical position, together with the pivoting of the rear yoke 46 on the pins 85 and 86, and the journaling of the bracket or ring member 80 on the swinging member 70 permits the gear shift lever to be disposed in practically any lateral position about the transmission. Thus, in any position, lateral movement of the gear shift lever will cause the arm 50 and the shift lever shaft 22 to be moved laterally, and fore and aft movement of the gear shift lever will occasion fore and aft swinging movement of the arm 50 and the arm 21. While, so far as the mounting of the gear shift lever 30 itself is concerned, the hand lever can move in any direction, yet the connections between the hand lever and the rocking and swinging brackets are such that the latter parts serve to restrain the gear shift lever to either lateral or longitudinal movements, or, in other words, the gear shift lever 30 can move only in the same direction and substantially to the same extent as the shift lever arm 21.

While, so far as the construction has been described above, the gear shift lever 30 can be placed in almost any position with respect to the transmission, yet as long as the connecting link structure 40 is of any given length, the gear shift lever is limited to a position in a radius about the axis of the bracket member 80. Also, the accuracy of the control, that is, the ability of the connections between the gear shift lever and the shifting mechanism of the transmission to insure that a given angular displacement of the gear shift lever, either laterally or longitudinally, will occasion the desired lateral or longitudinal movement of the shifting mechanism, depends to a considerable degree upon the retention of the proper and desired angular relation between the forked sections 38 and 46. In the preferred construction, the pivot supports 41 and 85, 86, about which the forked parts move, lie in the same plane, and in order to adjust this angularity as well as to arrange for adjusting the position of the hand lever 30 toward or away from the transmission, or, in other words, to provide for lengthening or shortening the link construction 40, I provide a threaded section 100 (Figure 8) on the forward end of the tubular link member 44, and on this end of the member 44 an adjusting bracket 101 is threaded. This bracket includes a split section 102, 103 which carries a clamping bolt 104 for the purpose of fixing the position of the member 101 on the link 44. Also, an arm 105 is carried by the bracket 101 and is adapted to be disposed between the arms 107 and 108 of a similar bracket 110 also threaded onto the rod 44 and also provided with split sections 111 which are adapted, when in the proper position, to be clamped about the end of the rod 44 by a clamping bolt 112. Preferably, although not necessarily, the yoke 38 and the bracket 110 are formed integrally, but they may be made separately and rigidly secured together in any desired relation.

The spacing between the arms 107 and 108 is appreciably greater than the thickness of the bracket arm 105, and the arms or lugs 107 and 108 carry adjusting screws 115 and 116, so that when one is tightened and the other loosened, the bracket 101 is swung angularly with respect to the bracket 110. A keyway in the form of a slot 117 is provided in the threaded portion of the link 44, and a key 118 is adapted to be disposed in this slot and mounted on the bolt 104 between the clamping sections 102 and 103 for the purpose of fixing the bracket 101 in a given angular relation with respect to the rear forked end 46 of the link construction 40.

The manner of assembling and adjusting the link connection is substantially as follows. The adjusting bracket 101 is threaded onto the rod 44 to the position desired, depending upon the desired effective length of the link construction 40, and when the bracket 101 is brought to its desired position, the key 118 is inserted into the elongated keyway 117, and then the bolt 104 is inserted and the sections 102 and 103 firmly clamped about the end of the rod or link 44. However, at the same time that the bracket 101 is being threaded onto the rod 44, the other bracket 110 is also being threaded, with the lugs 107 and 108 disposed about the arm 105 on the bracket 101. After the bracket 101 has been clamped in position, then the adjusting screws 115 and 116 are tightened or loosened, thereby swinging the bracket 110 through a small angular displacement relative to the bracket 101 until the relative angularity between the forked section 38 and the rear forked section 46 has been properly determined. As stated above, preferably the forked ends 38 and 46 lie in the same plane. When the clamping bolt 112 is tightened the bracket 110 is firmly secured to the rod 44. If desired, the adjusting bolts 115 and 116 can be fixed by firmly screwing both of them against the arm 105 so that, even if the clamping bolt 112 should be loosened, the adjusting bolts 115 and 116 will hold the parts 38 and 46 in the proper angular position with respect to one another. After these adjustments are made and the parts securely clamped together, the link construction 40 acts as an integral connecting member for causing the gear shift lever 30 and shift rod selecting and actuating member 21 to execute substantially the same movements in the manner described above.

The construction set forth above is, as is obvious, adapted for practically any type of transmission from the passenger car type, in which there is one reverse ratio and three forward speeds, to transmissions having two or more reverse drives and five or more forward speeds. In transmissions having more than one shift rod, it is usually desirable to provide some form of detent mechanism for aiding the operator in determining what ratio is engaged, and since the present invention has been illustrated as embodied in a transmission having four shift rods, the present invention also provides detent or restraint mechanism embodying means for preventing the selection of either of the outer shift rods, 11 or 14, unless a positive effort is made to actually select one of these rods. To this end, the inner end of the shift lever shaft 22 is provided with a flattened section 137 having two shoulders 138 and 139 spaced apart laterally of the transmission approximately the same distance as the spacing between the lugs 17 and 18 for the two inner shift rods 12 and 13. Cooperating with the flattened section 137 of the shaft is a poppet ball 140 which is pressed against the flattened portion 139 by a spring 141. Thus, when the gear shift lever 30 has been actuated to shift the shifter arm 21 laterally to select either of the shift rods 12 or 13, the shaft 22 is shifted to bring either of the shoulders 138 and 139 up against the ball 140, but not beyond, so that this selection of the shift rods 12 and 13 is made without encountering any resistance due to the spring 141. However, when an attempt is made to select either of the outer shift rods, 11 or 14, either the shoulder 138 or the shoulder 139 is brought up against the poppet ball and the latter must then be moved against the tension of the spring 141 before the shaft 22 and the shift arm 21 can complete their lateral selecting movement. By this means, the operator is made aware of the fact that one of the outer lugs have been selected, rather than one of the inner lugs.

While I have shown and described above the preferred construction in which the principles of the present invention have been embodied, it is to be understood that my invention is not to be limited to the specific details shown and described above, but that, in fact, widely different means may be employed in the practice of the broader aspect of my invention.

What I claim, therefore, and desire to secure by Letters Patent is:

1. A control device for selective transmissions and the like comprising a member movable in one direction to select certain ratios and movable in another direction to engage the ratio selected, a remotely mounted shift lever mounted for oscillatory movement, a rod hingedly connected with said lever at a point spaced from its pivoted support, the movement of the rod relative to the gear shift lever being limited to movement about a single axis, and means connecting the opposite end of said rod with said member for generally horizontal rotation relative to the latter and causing said member to move with the shift lever irrespective of the lateral position of the lever about the axis of rotation of said rod on said member.

2. A control device for selective transmissions and the like having means movable in two directions to select and effect different driving ratios, means operatively connected therewith to shift the same, said means being mounted for movement limited to said two directions, a gear shift lever adapted to be mounted in various positions relative to the transmissions, a torsion link, means pivotally connecting one end of said torsion link with said gear shift lever for movement relative thereto about a single axis, a ring-like member connected for rotation with said shifting means, and means pivotally connecting the other end of said torsion link with said ring-like member for movement relative thereto about a single axis disposed in the same plane as said first-named single axis, so that said lever, in moving said shifting means, executes the same movement irrespective of the position of said gear shift lever with respect to the transmission.

3. A control device for selective transmissions and the like comprising means movable in two directions at right angles to one another to select and complete the engagement of the desired ratio in said transmission, a member operatively connected with said means and constrained to move only in the directions which said means moves, a remotely mounted gear shift lever, a link having one end hingedly connected with said shift lever, and means mounted for rotation on and supported by said movable member and hingedly connected with the other end of said link means, so that the only permissive relative movement between said link means and said rotatably mounted means is a pivotal movement about a single axis, whereby said gear shift lever and said movable means are caused to move together.

4. A control device for selective transmissions and the like comprising means movable in two directions at right angles to one another to select and complete the engagement of the desired ratio in said transmission, a member operatively connected with said means and constrained to move only in the directions which said means moves, a remotely mounted gear shift lever, a link having a forked end hingedly connected directly to said shift lever, a similar forked end formed on the other end of said link member, and means hingedly connected with the second forked end of said link means and mounted for rotation on and to move bodily with said movable member for causing said gear shift lever and said movable means to move together.

5. A control device for selective transmissions and the like comprising a member movable both laterally and longitudinally of the transmission housing for selecting and engaging various ratios, a swinging member mounted for movement about an axis, means supporting said swinging member and mounted on said housing for rocking movement about an axis disposed at right angles to the axis of movement of said swinging member, a gear shift lever supported remotely from said transmission for universal movement, link means hingedly connected directly to the gear shift lever at a point spaced from its universal mounting, means rotatably mounted on said swinging member for movement about an axis that intersects said first two axes, and means hingedly connecting said link means to said rotatably mounted means for causing said gear shift lever and said swinging member to execute the same movements, irrespective of the position of the gear shift lever, whether forwardly, rearwardly, or to one side of the transmission.

6. A control device for selective transmissions and the like having means movable in two planes normal to one another, said device comprising an arm rigidly connected to move with said means, a remotely disposed shift lever mounted for universal movement, a member connected with said arm and supported by gimbal means respectively for pivotal movement about two axes lying in or parallel to said planes, and means including a torsion link hingedly connected to said member at a point spaced from said two axes, said torsion link also being hingedly connected with said shift lever.

7. A control device for selective transmissions and the like, said device comprising an arm movable in two planes normal to one another, a remotely disposed shift lever mounted for universal movement, a member supported by gimbal means and limited to pivotal movement about two axes, one lying substantially in and the other being substantially parallel to said planes, respectively, means serving as a sleeve rotatable on and embracing said member, and link means having forked ends pivotally connected, respectively, with said shift lever and said sleeve for relative movement with respect thereto about parallel axes.

8. A control device for selective speed transmissions and the like including a housing and a member shiftable laterally thereof to select certain ratios and movable longitudinally to effect a selection, said device comprising bracket means mounted for rocking movement about an axis extending in the same direction as the direction of lateral movement of said shiftable member, a member pivotally supported by said rockable bracket means for movement about an axis extending in a direction longitudinally of the transmission housing, a gear shift lever adapted to be mounted in various positions spaced from said housing, and means rotatably connected with said pivoted member and serving to operatively connect the same with said gear shift lever in any of its various positions, whereby said lever is movable laterally and longitudinally with the shiftable member of said transmission, irrespective of the position of said lever relative to the transmission.

9. A control device for selective transmissions and the like comprising a gear selecting and shifting member constrained for swinging movement in parallel planes and lateral movement in a direction normal to said planes, a swingably mounted member operatively connected to move said selecting member and constrained for swinging movement in two directions, one direction being parallel to said planes and the other being in the same direction as the lateral movement of said selecting member, a gear shift lever mounted for movement at a point remote from said swinging member, a link pivotally connected with said shift lever and constrained for movement with respect thereto about a pivot axis, and means connecting the other end of said link with said swinging member and constraining the relative movement therebetween to a rotation about an axis that intersects the axis of swinging of said swinging member and to a pivotal motion between said link and said swinging member about an axis which lies parallel with respect to the pivot axis between said link and said gear shift lever.

10. A control device for transmissions and the like comprising, in combination, a member mounted for movement and constrained to move only in two directions normal to one another, a remotely mounted gear shift lever having a ball and socket support and one portion terminating in a laterally directed apertured section, a connecting link having forked sections at its ends lying in the same plane, one end of said link being connected with the laterally directed section of the gear shift lever, a ring member mounted to rotate on said first named member and means pivotally connecting the other forked end of said link with said ring, whereby said gear shift lever is constrained to move in parallelism with said first named member irrespective of the position of the gear shift lever with respect to the transmission.

11. In a transmission having a plurality of shift rods, a shift lever shaft mounted for sliding and rocking movement in the transmission and extending exteriorly thereof, and an arm fixedly secured to said shift lever shaft and adapted to selectively engage and move any one of said rods, the combination of a rocking bracket mounted for movement about an axis coinciding with said shaft, a swinging member pivotally supported on said rocking bracket for movement about an axis disposed at right angles to the axis of rocking of said bracket, an exterior arm fixedly secured to said shaft, means carried at one end of said swinging member for receiving the outer end of said exterior arm, swinging movement of the swinging member about its axis on said rocking bracket serving to react against the outer end of said exterior arm to slide said shaft in its supports and rocking movement of said bracket serving to rock said swinging member and said exterior arm about an axis coinciding with said shaft, thereby rocking said shaft, a remotely mounted gear shift lever, a member rotatably mounted on said swinging member, and link means having a hinged connection with said gear shift lever and said rotatable member whereby fore and aft and lateral movements of said lever, irrespective of its position with respect to transmission, will occasion corresponding movement of said exterior arm and said shift lever shaft.

12. A gear shifting connection for a transmission or the like including a selecting and shifting member mounted for lateral and rocking movement in the transmission, said connection comprising a rocking bracket mounted on the transmission, a swinging member pivotally supported on said rocking bracket for movement with respect thereto, means establishing a ball and socket joint between the outer end of said swinging member and the outer end of said selecting and gear shifting member, and means connected with the outer end of said swinging member adjacent said ball and socket joint for actuating said swinging member to move said selecting and shifting member.

13. A gear shifting connection for a transmission or the like including a selecting and shifting shaft mounted for lateral and rocking movement, said connection comprising an arm fixed to said shaft, a rocking bracket mounted about said shaft, a swinging member pivotally supported on said rocking bracket, means operatively connecting said swinging member with said arm, and a ring member rotatably carried by said swinging member.

14. A gear shifting connection for a transmission or the like including a selecting and shifting member mounted for lateral and rocking movement in the transmission and including a part extending exteriorly thereof, said connection comprising a rocking bracket mounted for movement about an axis coinciding with the axis of rocking movement of said selecting and gear shifting member, a swinging member pivotally supported on said rocking bracket for movement about an axis disposed at right angles to said first axis, means operatively connecting said swinging member with said selecting and gear shifting member, a ring member rotatably carried by said swinging member, and an operating link having a hinged connection with said ring member.

15. A control device for transmissions including shift rods and a housing therefor, said device comprising a shift lever selectively engageable with said shift rods, a shaft extending to the outside of said housing and carrying said lever at its inner end, an operating arm mounted for movement relative to the transmission housing and connected with said shaft to rock the same when moved in one direction, and to shift the same axially when moved in another direction, and means operatively connected with said arm and including a part rotatable about the longitudinal axis of said arm and a second part hingedly connected with said first part for movement about a pivotal axis disposed generally at right angles to the axis of rotation of said first part.

16. A control device for transmissions including shift rods and a housing therefor, said device comprising a shift lever selectively engageable with said shift rods, a shaft extending to the outside of said housing and carrying said lever at its inner end, an operating arm having a ball end and fixedly secured to the outer end of said shaft, a rockable bracket embracing said shaft and mounted for rocking movement about the axis of said shaft, a member pivotally connected with said rockable bracket for swinging movement in the plane of said axis, means forming a socket at one end of said swinging member to receive the ball end of said arm, and means connected with said swinging member for shifting said arm and said lever.

17. A control device for transmissions including shift rods and a housing, said device comprising a gear shift lever, a universal mounting therefor providing for pivotal movement of the gear shift lever relative thereto in any direction, a selecting and shifting member mounted for lateral and longitudinal movement relative to the transmission housing, a rockable bracket mounted for movement about a transverse axis, a member pivotally connected with said rockable bracket for swinging movement in the plane of said axis, means connecting said swinging member with said selecting and shifting member, a ring member embracing said swinging member and mounted for rotation thereon about an axis extending at right angles to said transverse axis and also at right angles to the axis of said swinging member carried by the rockable bracket, said ring member being held against axial displacement on the swinging member, and link means capable of transmitting torsion and pivotally connected to said gear shift lever at a point spaced from said universal mounting therefor and to said rotatable member about a pivot axis disposed at right angles to the axis of rotation of the rotatable member, whereby said gear shift lever may be disposed at substantially any point radially about the axis of rotation of said member and can be shifted laterally to move said selecting and shifting member laterally and can be shifted longitudinally to move said selecting and shifting member longitudinally.

18. A gear shifting connection for a transmission or the like including a selecting and shifting member mounted for lateral and rocking movement, said connection comprising a rocking bracket mounted for movement relative to the transmission, a swinging member pivotally supported on said rocking bracket, means operatively connecting said swinging member with said selecting and gear shifting member, a member rotatably carried by said swinging member and including upper and lower circular sections journaled on the swinging member, and an operating member having a forked end hingedly connected to said rotatable member at points between the ring sections of the latter.

19. A gear shifting connection for a transmission or the like including a selecting and shifting member mounted for lateral and rocking movement, said connection comprising a rocking bracket mounted for movement relative to the transmission, a swinging member pivotally supported on said rocking bracket, means operatively connecting said swinging member with said selecting and gear shifting member, a ring member rotatably carried by said swinging member, a gear shift lever mounted at a distance from said swinging member, and a control rod hingedly connected, respectively, to said gear shift lever and to said ring member, said control rod including relatively movable sections and adjustable means for maintaining said sections in adjustably fixed relation.

20. A gear shifting connection for a transmission or the like including a selecting and shifting member mounted for lateral and rocking movement, said connection comprising a swinging member movable relative to the transmission, a member rotatably carried on said swinging member, a gear shift lever mounted for universal movement, and a torsion link hingedly connecting said gear shift lever and said rotatable member, said link comprising threadedly interconnected sections, each having a forked end, and said sections being connected by pivot means associated, respectively, with said forked ends to said gear shift lever and rotatable member, respectively, and juxtaposed lug means carried on said sections and provided with adjusting means for varying the angular relation between the forked ends of said link sections.

21. A torsion link for gear shifting connections and the like, comprising a tubular member having a forked portion at one end and a threaded section at the other end, a forked member adapted to be threaded onto the end of said tubular member opposite the first forked portion, an adjusting member adapted to be threaded onto said other end and having a pair of spaced lugs, a lug formed on said forked member and adapted to be disposed between said pair of lugs, and adjusting screws carried, respectively, by said pair of lugs and adapted to be screwed into engagement with opposite sides of the lug carried by said forked member so as to determine the angular relation between the forked portions at opposite ends of the torsion link.

22. A torsion link for transmission gear shifting connections and the like, comprising a tubular member carrying a fork at one end and threaded at the other end, an adjusting collar adapted to be threaded onto said other end of the tubular member and including a split section adapted to be clamped about the threaded end of the tubular member, the latter having a slot therein, a pair of spaced lugs carried by said adjusting collar, a forked member having a split shank and adapted to be screwed onto the threaded end of said tubular member and provided with a lug disposed between the pair of lugs on said adjusting collar, said forked member and said adjusting collar arranged to be threaded onto the threaded end of said tubular member at the same time, a clamping bolt for clamping the adjusting collar against rotation on said tubular member, a key mounted on said clamping bolt and arranged to be disposed between the split sections of the collar and in the slot of the tubular member, whereby the collar is fixed against rotation, a pair of screws carried, respectively, by the pair of lugs on the adjusting collar and engaging opposite sides of the lug carried by said forked member, and a clamping bolt carried by the latter for securing the same to the tubular member in adjusted position as determined by the adjusting screws carried by said pair of lugs.

23. A control device for a transmission having shift rods, said device comprising a rockably mounted member operatively connected to control said shift rods, a gear shift lever, a rigid link pivotally connected at one end with said gear shift lever for movement relative thereto about a single axis, means rotatably mounted on said rockable member for movement about the latter, and means pivotally connecting the other end of said rigid link with said rotatable means so as to constrain relative movement between the latter and said link to a pivotal movement about a single axis.

24. A control device for transmissions including shift rods, said device comprising a pivoted member operatively connected to selectively control said shift rods, means serving as a ring member disposed about and rotatable with respect to said pivoted member and connected with said pivoted member so that angular movement of said rotatable member shifts said pivoted member, a rigid link pivotally connected at one end with said ring member and constrained against movement relative thereto except about a pivot axis, and means pivotally connecting the other end of said rigid link with said gear shift lever and serving to restrain relative movement between said rigid link and said gear member except about a pivot axis, said two pivot axes being parallel.

25. A control device for selective transmissions and the like having a plurality of shift yokes spaced apart in one direction and adapted when selectively engaged to be shifted in a direction generally perpendicular to said one direction, comprising an arm movable in one direction to select and engage a shift yoke and movable in the other direction to shift the selected yoke, a remotely disposed shift lever mounted for universal movement, a link hingedly supported at one end on said lever so as to be rotated generally about its longitudinal axis with the lever when the latter is swung in one direction and moved generally longitudinally when the shift lever is swung in the other direction, and means serving as a universal joint connecting the other end of said link with said arm and accommodating variations in the position of the shift lever laterally relative to said arm.

ROBERT LAPSLEY.